UNITED STATES PATENT OFFICE.

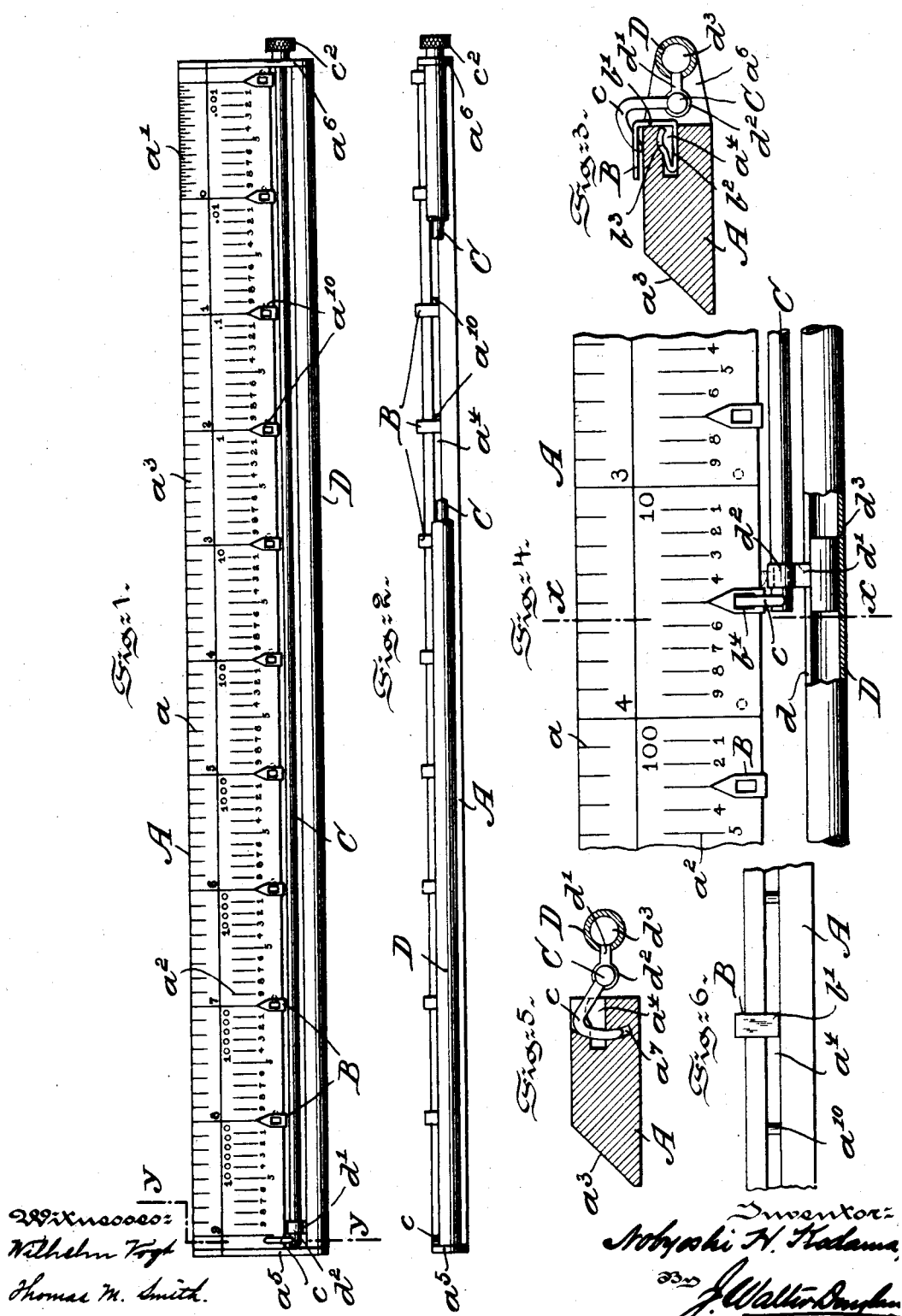

NOBYOSHI H. KODAMA, OF PHILADELPHIA, PENNSYLVANIA.

ADDING OR SUBTRACTING RULE.

SPECIFICATION forming part of Letters Patent No. 711,252, dated October 14, 1902.

Application filed January 27, 1902. Serial No. 91,367. (No model.)

*To all whom it may concern:*

Be it known that I, NOBYOSHI H. KODAMA, a subject of the Emperor of Japan, residing at the city of Philadelphia, in the county of Philadelphia and State of Pennsylvania, have invented certain new and useful Improvements in Adding or Subtracting Rules, of which the following is a specification.

My invention has relation to a rule for adding and subtracting sums quickly and accurately by rapid manipulation of certain accessories of the rule; and in such connection my invention relates to the construction and arrangement of such a rule for the said purposes.

The nature and scope of my invention will be more fully understood from the following description, taken in connection with the accompanying drawings, forming part hereof, in which—

Figure 1 is a top or plan view of a rule embodying characteristic main features of my said invention. Fig. 2 is a rear end elevational view of the same, certain portions being broken away to more clearly illustrate the construction of the rule. Fig. 3 is a transverse sectional view on the line $x\ x$ of Fig. 4. Fig. 4 is a top or plan view, enlarged, of a portion of the rule, partly in broken section, to show the movable hooked finger, index-pointers, and means for shifting the pointers in connection with the hooked fingers. Fig. 5 is a transverse sectional view on the line $y\ y$ of Fig. 1, showing the movable and fixed hollow bars of the rule and the hooked finger engaging the rule-body when not in use and to prevent the movable bar of the rule shifting through any tilting of the same; and Fig. 6 is a rear end elevational view of the rule, showing one of the index-pointers in position and the extent or range of movement of the same within its confined scale of the series of calculating-scales of the rule.

Referring to the drawings, A represents the rule, provided on its face with ordinary graduated measuring-scales $a$ and $a'$ and with a series of calculating-scales $a^2$, of suitable dimensions. The measuring graduated scales of the rule are preferably provided on the inclined surface portion $a^3$ of the rule A. In rear of the body portion of the rule is provided lengthwise of the same an irregular channel or way $a^4$, as clearly shown in Fig. 3, for the reception of the body portion of the index fingers or pointers B. At the points of beginning of the respective calculating-scales are arranged vertical posts $a^{10}$ to limit the extent or range of movement of each pointer within its designated scale, as shown in Figs. 1, 2, and 6. The pointer or finger B consists of a right-angled member $b'$, adapted to span the rear end of the rule A and made with a bent portion $b^2$, extending into the channel or way $a^4$ and having an inclined and arched portion $b^3$, adapted to conform to the shape of the roof of the channel or way $a^4$ of the rule to hold the finger or pointer B proper under spring tension and yet to permit of the shifting of the same back and forth within the range of its scale between the posts $a^{10}$ in Fig. 6.

In the top of each finger or pointer B and located above the rule is provided a slot $b^4$ to receive a hook $c$, connected with a movable longitudinal bar C of the rule A for permitting of the shifting of the same back and forth in connection with a pointer within range of its particular scale. The bar C carries at one end the hook $c$, and at the other end it is provided with a milled button $c^2$ for shifting the said bar C back and forth. This bar is also adapted to be afforded a slight rotary movement by the said button $c^2$. D is a fixed hollow bar secured to the brackets $a^5$ and $a^6$ at the respective ends of the rule A. This hollow bar D is provided with a longitudinal slot $d$, through which projects a tongue $d'$, connecting the enlargement or block $d^3$ within the hollow bar D with the ring $d^2$, forming a support for the movable bar C when the bar C is shifted laterally by means of its button $c^2$. The bar C may also turn in the supporting-ring $d^2$. At the left-hand end of the rule A is provided an opening $a^7$, adapted to receive the hook $c$ of the movable bar C when the rule is not in use and to thereby lock or secure the movable bar C against accidental shifting.

As illustrated in the drawings, the scales upon the rule are arranged in units, tens, hundreds, and up to millions, and also in decimals of tenths, hundredths, thousandths, &c. Each compartment or division of the scale is subdivided into ten parts. If three numbers are to be added—say "235+154+423"—the operation is as follows: A pointer B in the units-compartment is first shifted by the hook c to the fifth subdivision or to "5," the tens-pointer is moved to "3," and the hundreds-pointer is moved to "2." The rule now shows on its face two hundreds, three tens, and five units, or "235." The units-pointer is now moved the four units-points in "154," making the pointer stand at "9," the tens is advanced five points to "8," and the hundreds one point to "3," and the rule shows on its face three hundreds, eight tens, and nine units, or "389," the sum of "235" and "154." The number "423" is now added. As the three units to be added would, if possible, carry the units-pointer from "9" to "12," it is necessary, as the limit of the pointer is from "0" to "9," to shift the tens-pointer one point from "8" to "9" and to retract the units from "9" to "2," thus indicating one additional ten and two units, or "12." The tens-pointer at "9" would now be advanced two points to "11," if such were possible; but instead it is shifted back to "1," and the hundreds-pointer shifted forward from "3" to "4." The additional four hundreds in "423" are now added by shifting the hundreds-pointer from "4" to "8." The rule now indicates eight hundreds, one ten, and two units, or "812," the sum of the three numbers, "235," "154," and "423." If desired, subtraction may be obtained by shifting the pointers backward after they are once set at the numbers representing the subtrahend. By locking each pointer B frictionally in the respective compartments and permitting it to be moved only by means of the rod C and hook c, the accuracy of the computation is insured, since if the pointers were readily shifted by hand their accidental displacement in the handling of the ruler would be possible.

Having thus described the nature and object of my invention, what I claim as new, and desire to secure by Letters Patent, is—

1. In a calculating-rule of the character described, a scale divided into a series of compartments, each properly subdivided, a pointer for each compartment and sliding therein, means for limiting the range of movement of each pointer to its specific compartment, a laterally-sliding bar, a hook formed on said bar and adapted to engage each pointer in series, and means for sliding said bar back and forth on the rule.

2. In a calculating-rule of the character described, a scale divided into a series of compartments, each properly subdivided, and a pointer for each compartment and sliding therein, combined with means for shifting each pointer in series, said means comprising a movable bar, supported at one edge of the rule, means for laterally moving said bar therein, a hook formed on the bar and adapted to engage each pointer successively to lock the pointer to the bar and means for turning said bar in its support to bring the hook into and out of engagement with a pointer.

3. In a calculating-rule having on its face a series of divisions or compartments, each division being properly subdivided, a series of pointers each arranged to slide in one of the divisions or compartments, a hollow bar arranged at one edge of the rule, said bar longitudinally slitted, a block sliding in the hollow bar, a tongue and ring projecting from the block outside the hollow bar, a movable bar supported at one end in said ring, a milled button at the other end of said movable bar and constituting a means for manually sliding the movable bar, the ring and the block, and a means for turning the movable bar in said ring, and a hook formed on the movable bar and adapted to engage each pointer successively to lock the movable bar to said pointer.

In testimony whereof I have hereunto set my signature in the presence of two subscribing witnesses.

NOBYOSHI H. KODAMA.

Witnesses:
J. WALTER DOUGLASS,
THOMAS M. SMITH.